United States Patent [19]
Oura et al.

[11] Patent Number: 5,814,359
[45] Date of Patent: Sep. 29, 1998

[54] SALT SOLUTION FOR PRODUCING SOY SAUCE AND PROCESS FOR PRODUCING SOY SAUCE

[75] Inventors: Masami Oura; Hironaga Hashiba, both of Noda, Japan

[73] Assignee: Kikkoman Corporation, Noda, Japan

[21] Appl. No.: 730,204

[22] Filed: Oct. 15, 1996

[30] Foreign Application Priority Data

Oct. 30, 1995 [JP] Japan .................................. 7-281909

[51] Int. Cl.⁶ .................................................... A23L 1/238
[52] U.S. Cl. ............................ 426/46; 426/648; 426/649
[58] Field of Search .................... 426/648, 649, 426/652, 46

[56] References Cited

U.S. PATENT DOCUMENTS

| | | | |
|---|---|---|---|
| 690,126 | 12/1901 | Weddell | 426/649 |
| 1,394,236 | 10/1921 | Togano | 426/46 |
| 2,107,133 | 2/1938 | Snelling | 426/46 |
| 2,606,839 | 8/1952 | Evans | 426/649 |
| 2,764,472 | 9/1956 | Cady et al. | |
| 3,830,939 | 8/1974 | Sakasai | 426/46 |
| 3,873,730 | 3/1975 | Luksas | 426/46 |
| 4,038,365 | 7/1977 | Patil et al. | |
| 4,115,219 | 9/1978 | Gancy et al. | |
| 4,209,535 | 6/1980 | Williams | 426/46 |
| 4,288,419 | 9/1981 | Copenhafer | 423/190 |
| 4,308,284 | 12/1981 | Node | 426/46 |
| 4,336,232 | 6/1982 | Moritz . | |
| 4,346,114 | 8/1982 | Hagiwara | 426/46 |
| 4,722,846 | 2/1988 | Abe | 426/46 |
| 5,023,803 | 6/1991 | Loftis et al. . | |
| 5,141,756 | 8/1992 | Bajracharya | 426/46 |
| 5,523,100 | 6/1996 | Teh | 426/46 |
| 5,562,943 | 10/1996 | Koh | 426/649 |

FOREIGN PATENT DOCUMENTS

| | | | |
|---|---|---|---|
| 0 417 481 A1 | 3/1991 | European Pat. Off. . | |
| 3009824 | 4/1982 | Germany | 426/648 |
| 58116655 | 11/1983 | Japan . | |
| 5-186215 | 1/1992 | Japan . | |

*Primary Examiner*—Carolyn Paden
*Attorney, Agent, or Firm*—Banner & Witcoff, Ltd.

[57] ABSTRACT

A soy sauce is produced by mixing a salt solution having a hard component concentration of not more than 20 ppm as calcium with a soy sauce koji, and subjecting the mixture to fermentation and ageing and then compressing it to obtain a crude soy sauce, and heat-treating the crude soy sauce in a plate-type exchanger, thereby the hard component decomposition on the plate surface being lowered and the frequency of washing the plate surface resulting in considerable decrease.

1 Claim, 2 Drawing Sheets

SALT SOLUTION FOR PRODUCING SOY SAUCE AND PROCESS FOR PRODUCING SOY SAUCE

BACKGROUND OF THE INVENTION

1) Field of the Invention

The present invention relates to a salt solution for producing soy sauce, and a process for producing soy sauce. More particularly, the invention relates to a salt solution for producing soy sauce which comprises precipitating a hardness component such as calcium and magnesium contained in a crude salt solution as a carbonate sediment, separating and removing the sediment therefrom to obtain a supernatant liquid and neutralizing the supernatant liquid, and a process for producing soy sauce using the salt solution.

2) Description of the Related Prior Art

Soy sauce is generally produced via the following steps: a step of preparing a soy sauce koji; a step of admixing the koji with a salt solution to obtain a Moromi; a step of aging the Moromi for a predetermined period of time to obtain a matured Moromi; a step of compressing the matured Moromi to obtain a crude soy sauce through solid-liquid separation; and a step of heating the crude soy sauce for the purpose of flavoring, color-adjusting and sterilization.

In the production of soy sauce, the salt solution may be used in an appropriate amount at any steps of from matured Moromi to the final product, where required, besides the above-mentioned step of mixing with the koji.

The salt solution may be obtained usually by dissolving a sea salt or rock salt (which is referred to as "starting salt" hereinafter) with water. The thus obtained salt solution (which is referred to as "crude salt solution" hereinafter) is used by clarifying and filtering it, followed by adjusting to a preferred salt concentration of, for example 20 to 30% (w/v). Generally, any treatments other than the clarification and filtration steps to the crude salt solution are not particularly carried out in the production of soy sauce.

In the heating step, there is known a process for killing spores in soy sauce by heat-treating it with a high-temperature/short time using a plate-type heat exchanger (see Patent Kokai No.58-116655).

When the crude soy sauce is heat-treated, for example at a temperature of 90° to 130° C. for 5 seconds to 30 minutes in the heating step using the plate-type heat exchanger to kill spores in the soy sauce, scales are deposited on the plate surface of the heat exchanger in contact with the soy sauce gradually with time, resulting in lowering of not only a heat efficiency but also a throughput capacity of the heat exchanger and consequently in discontinuation of the heat treatment and each time the plate surface must be washed. Frequent occurrence of such a discontinuation will considerably lower the workability of the heat treatment of the soy sauce, and its solution has been strongly desired.

The present inventors studied a calcium concentration in various crude soy sauces and found that the calcium concentration was usually 100 ppm or less as calcium, but sometimes amounted to about 250 to about 550 ppm. It was also found that when crude soy sauce was heated under the above-mentioned conditions, the amount of scales deposited on the plate surface of heat exchanger was in a close relation to the calcium concentration in crude soy sauce and a remarkably large amount of scales was deposited when the calcium concentration of crude soy sauce was about 150 ppm or more, and further found that scale deposition on the plate surface was remarkable when the heating temperature of crude soy sauce was over 90° C.

As a result of further studies, it was found that scatterings in the calcium concentration of crude soy sauce depend on that of a salt solution used during the production steps of soy sauce. It was found that calcium concentration of crude salt solution was usually about 50 to about 150 ppm as calcium as calculated in salt concentration of 25% (w/v), but amounted to about 200 to about 600 ppm as calcium, for example, when rock salt is used as starting salt.

Thus it was found for the first time that deposits of calcium etc. on the plate surface, as observed when the soy sauce was heat-treated through a plate-type heat exchanger at a high temperature for a short period of time, were due to hardness components of calcium, magnesium, etc.( which may be referred to as hardness components) contained in the crude salt solution.

However, the above-mentioned new finding that the hardness components contained in the crude salt solution cause the formation of deposits on the plate surfaces of a plate-type heat exchanger has not been so far recognized in the production of soy sauce, and even removal of the hardness components from the crude salt solution has not been in practice, because it was not recognized that the presence of hardness components in the soy sauce has an adverse effect on the quality of the final soy sauce.

In the production of purified salt in the common salt manufacturing industry, on the other hand, it is known to remove the hardness components from a crude salt solution prepared by dissolving the starting salt in water by a method as a pretreatment for ion exchange membrane electrolysis, the method comprising adding sodium hydroxide and sodium carbonate to a crude salt solution into alkaline and crystallizing the hardness components of calcium, magnesium, etc. out, then settling the resulting slurry containing crystals, ultra-filtering the overflowing liquid to completely remove suspended matters therefrom, and treating the filtrate with a chelating resin to remove calcium and magnesium to a concentration of 10 ppb or less, or by another method as a pretreatment for ion exchange membrane electrolysis, the method comprising adding sodium hydrogen carbonate to the crude salt solution, followed by ultrafiltration and treatment of the filtrate with a chelating resin (see Patent Kokai No.5-186215).

However, these methods are not directed to the treatment of crude salt solution for producing soy sauce, but to the production of purified salt in the common salt manufacturing industry. Moreover, the methods require expensive device such as ion exchange membrane, ultrafilter and chelating resin.

SUMMARY OF THE INVENTION

An object of the present invention is to overcome defects of a salt solution which has been usually used for producing soy sauce, and to provide a salt solution for producing soy sauce having a lower amount of hardness components such as calcium and magnesium and a process for producing soy sauce by using said salt solution with less frequency of washing plate surface of a plate-type heat exchanger in the step of heating soy sauce.

According to the present invention, there are provided a salt solution obtained by admixing a crude salt solution having dissolved sea salt or rock salt with sodium carbonate or potassium carbonate as a carbonate, thereby precipitating the hardness components as sediments of carbonates; separating and removing the sediments; and neutralizing the resulting supernatant liquid, and a process for producing soy sauce by using the salt solution.

DETAILED DESCRIPTION OF THE INVENTION

Crude salt solution used for obtaining a salt solution for producing soy sauce according to the present invention includes a crude solution having any salt concentration, obtained by dissolving a starting salt such as sea salt and rock salt into water in a dissolving tank, particularly a salt solution having a higher concentration, for example, 200 ppm or more as calcium of hardness components such as sulfates, chlorides and bicarbonates mainly of calcium and magnesium is preferably used.

Carbonate to be added to the crude salt solution includes sodium carbonate and potassium carbonate, and may be used alone or in combination. It is particularly preferred to use sodium carbonate, because NaCl is a neutralization product when the supernatant liquid obtained by separating and removing the sediments is neutralized with a dilute hydrochloric acid or the like, and also because sodium carbonate is easily available.

These carbonates may be used in a solid state, but preferably in the state of an aqueous solution having a concentration of about 1 to about 10% (w/v) because of less solubility.

An amount of carbonate to be added to the crude salt solution depends on the content of hardness components in the crude salt solution, and in case of a crude salt solution containing a calcium concentration of 200 to 600 ppm, about 1.0 to about 3.0% (w/v) based on the crude salt solution of an aqueous 5% (w/v) sodium carbonate solution is added to the crude salt solution.

Usually, the concentration of hardness components in a crude salt solution can be determined from experiences from the kind of starting salt and water, which are used for dissolution to make the crude salt solution, and accordingly an appropriate amount of carbonate to be added can be readily determined.

In a reaction tank, the crude salt solution and the carbonate are mixed at the ordinary temperature for 5 to 120 seconds, preferably 10 to 60 seconds to allow the hardness components to react with the carbonate. In the reaction tank, these two reactants must be mixed with vigorous stirring, using a stirrer, etc. Reaction between the hardness components and the carbonate may be accelerated by the vigorous stirring to form sediments of fine particles of carbonates such as calcium carbonate and magnesium carbonate, making the reaction liquid white-turbid. A portion of the sediments separated and removed in a settling separator tank, which will be hereinafter explained, is returned to the reaction tank to mix with the reactants in the course of the reaction, where the returned sediments serve as nuclei to promote the formation of the sediments and consequently sediments of carbonates having relatively large particle sizes are obtained, that is, settling and removal of the sediments can be made more readily.

Supplying of the crude salt solution, carbonates and a portion of the sediments to be returned for promoting the formation of the sediments to the reaction tank and discharging of the reaction liquid therefrom can be carried out batchwise or continuously. An appropriate amount of water can be added to the reaction tank, if necessary, to make a preferred salt concentration.

The reaction liquid containing the sediments as a reaction product is then subject to separation and removal of the sediments in a settling separator tank to obtain a supernatant liquid. That is, the reaction liquid containing the sediments is fed to the settling separator tank and made to reside therein at the ordinary temperature. A longer residence time is favorable to settling and separation of the sediments, but needs a settling separator tank of larger capacity. But, the sediments may be allowed to settle by the residence time of 3 to 20 hours.

The sediments deposit on the bottom of the settling separator tank, but the sediments themselves are liable to coagulate on the bottom. Thus, it is preferable to remove the sediments by scraping with scraper blades continuously rotating at a slow speed.

On the other hand, the resulting supernatant liquid is discharged from the settling separator tank at the upper portion, and passed, if necessary, through a sand filter to remove the remaining insoluble matters from the supernatant liquid.

Supplying of the reaction liquid containing the sediments to the settling separator tank and discharging of the supernatant liquid or the sediments therefrom can be carried out batchwise or continuously. The scraped sediments are discharged in a slurry state to the outside of the settling separator tank and recovered. A portion of the recovered sediments is returned to the reaction tank. An appropriate amount of the sediments to be returned to promote the formation of sediments, as already described above, is, for example, 5 to 40% (v/v), based on the crude salt solution, while the remaining sediments in the slurry state are discharged for disposal or, if required, are further subjected to solid-liquid separation such as filtration. The resulting filtrate may be returned to the settling separator tank. Then, the supernatant liquid from the settling separator tank is neutralized to pH of about 7.0 with a dilute mineral acid such as dilute hydrochloric acid to obtain an aqueous salt solution for producing soy sauce. The resulting salt solution is admixed with soy sauce koji, the mixture is fermented and aged according to a conventional method, thereafter the aged mixture is compressed to prepare a crude soy sauce. The crude soy sauce is then heat-treated through a plate-type heat exchanger. The crude soy sauce prepared according to the present invention is completely free from deposition of hardness components on the plate surface even by heat-treatment at a high temperature for a short time, for example, 90° to 130° C. for 30 minutes to 5 seconds. According to the present invention, the hardness components such as calcium and magnesium contained in a crude salt solution for producing soy sauce, prepared by dissolving sea salt or rock salt into water, can be simply and easily removed therefrom, and the crude soy sauce prepared using the present aqueous salt solution thus obtained is completely free from deposition of the hardness components onto plate surface even by heat-treatment at a high temperature for a short time, for example, 90° to 130° C. for 30 minutes to 5 seconds in the heating step using a plate-type heat exchanger for destroying spores, and can considerably reduce the frequency of washing the plate surface.

Moreover, according to the present invention, the hardness components originating from the starting salt and also from water for the dissolution or the salt concentration adjustment can be removed at the same time.

PREFERRED EMBODIMENTS OF THE INVENTION

The present invention will be described in detail with reference to Examples and drawings.

EXAMPLE 1

(A Salt Solution for producing Soy Sauce obtained from a Crude Salt Solution having Dissolved Rock Salt)

Figure 1:
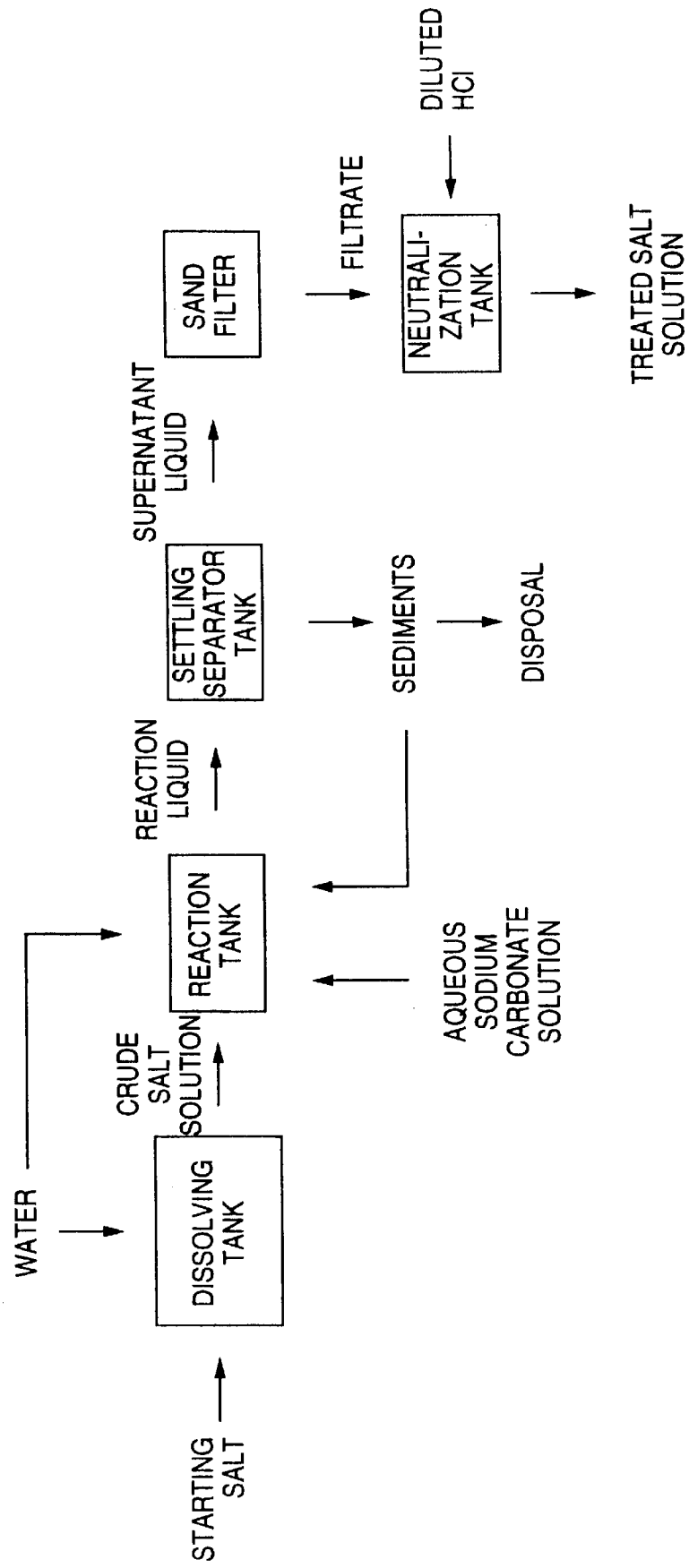
FIG. 1 is a flowdiagram showing a method of treating a crude salt solution.

As shown in FIG. 1, a salt solution for producing soy sauce (which may be referred to as "treated salt solution" hereinafter) was prepared by continuous treatment of a crude salt solution.

At first, rock salt was dissolved in water to obtain a crude salt solution having a salt concentration of 30% (w/v). The hardness components of the crude salt solution were determined by an atomic absorption spectrometer, Type Z-6100 (trademark of Hitachi, Ltd, Japan), and it was found that the calcium concentration was 550 ppm.

Then, 2.5 parts by volume of an aqueous 5% (w/v) sodium carbonate solution and about 20 parts by volume of slurry sediments obtained in advance in the same manner as the settling separation as will be hereinafter described were added to 100 parts by volume of the crude salt solution in a reaction tank, and water was also added to the reaction tank to make a salt concentration of 27% (w/v). The mixture was vigorously stirred with a stirrer for about 30 seconds to carry out reaction between the hardness components and the carbonate. A white-turbid reaction liquid was obtained thereby.

Then, the reaction liquid was continuously fed to a settling separator tank (made by EIMCO, Inc., USA) at the middle level position and made to reside therein for about 8 hours to settle the resulting sediments as the reaction product. The sediments were scraped away from the bottom of the tank by scraper blades continuously rotating at a slow speed so that no sediments may coagulate on the bottom of the settling separator tank, and the scraped sediments were discharged from the settling separator tank through a discharge outlet at the bottom position. On the other hand, the resulting supernatant liquid was continuously discharged through an overflow outlet at the upper position of the settling separator tank and then passed through a sand filter (made by EIMCO, Inc., USA) to remove the remaining water insoluble matters. A filtrate was obtained thereby.

A dilute hydrochloric acid was added to the filtrate with stirring to neutralize the filtrate to pH of 6.75, whereby a treated salt solution having a calcium concentration of 15 ppm was obtained. It was found that the hardness components in the crude salt solution were largely and simply removed from the present treated salt solution.

EXAMPLE 2

(The Production of Soy Sauce)

13.2 tons of defatted soybeans was cooked. Separately, 14.5 tons of wheat was roasted and crushed. The cooked defatted soybeans were mixed with the crushed wheat, and the mixture was inoculated with seed of soy sauce koji and cultivated, whereby 33.6 tons of soy sauce koji was obtained.

The soy sauce koji was divided into two equal portions. 23.8 tons of the treated salt solution having a salt concentration of 27% (w/v) and a calcium concentration of 15 ppm, obtained in Example 1, and 2.1 tons of water were added to the first equal portion (16.8 tons) of the soy sauce koji, and the mixture was charged into a charging tank to make a soy sauce Moromi according to the present invention. On the other hand, the second equal portion (16.8 tons) of soy sauce koji was subjected to charging in the same manner as used for the first portion, except only that the crude salt solution having a calcium concentration of 495 ppm, described in Example 1, whose salt concentration was adjusted to 27% (w/v) by adding water thereto, was used in place of the treated salt solution to make a comparative soy sauce Moromi.

The thus prepared two kinds of soy sauce Moromi were each subjected to fermentation and ageing for 6 months and compressing under control according to the conventional method to obtain crude soy sauces. The crude soy sauces were left standing and lees were removed therefrom, whereby an aliquot of crude soy sauce of the present invention and a comparative aliquot of crude soy sauce were prepared.

The calcium concentration of the crude soy sauces was determined in the same manner as described in Example 1, and found to be 20 ppm for the aliquot of the present invention and 450 ppm for the comparative aliquot. It is obvious that the crude soy sauce prepared by using the salt solution, i.e. the treated salt solution according to the present invention, has a considerably low calcium concentration.

Each about 30 $m^3$ of the aliquots of the crude soy sauce was continuously heated through a plate-type heat exchanger (made by APV) at an initial throughput of 100 l/min. under heat-treatment conditions of 115° C. for a residence time of 5 seconds to investigate changes in the initial throughput (l/min) with elapsed heat-treatment time (min.). Results are shown in FIG. 2.

Figure 2:
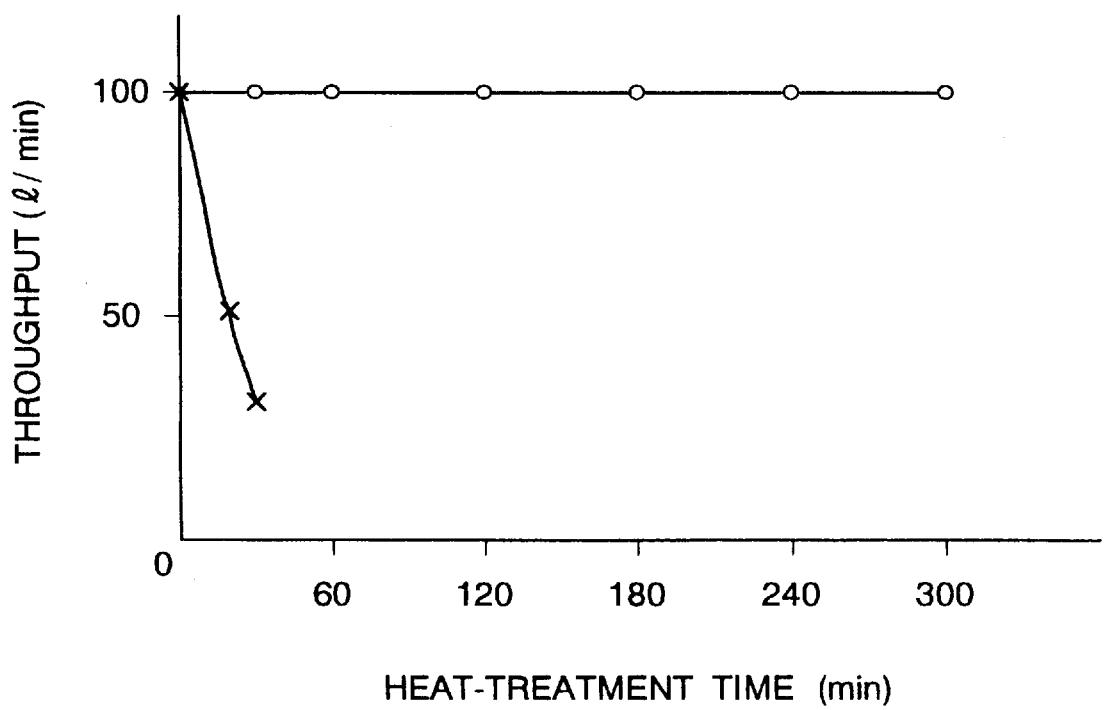
FIG. 2 is a graph showing changes in throughput (l/min.) with elapsed heat-treatment time (min.) when the crude sauce was continuously heat-treated.

As is obvious from FIG. 2, in case of the heat-treatment of the comparative aliquot of crude soy sauce (shown by cross-mark plotting in FIG. 2), the initial throughput was lowered to about 50 l.min., at 20 minutes after the start of the heat-treatment and to about 30 l/min. at 30 minutes after the start of the heat-treatment, which gave an adverse effect on the heat-treatment operation of soy sauce considerably. Thus, the heat-treatment was discontinued at the time of the throughput of about 30 l/min. and the plate surface was obliged to wash.

In case of the aliquot of the present crude soy sauce (shown by round circle-mark plotting in FIG. 2), no decrease in the initial throughput due to deposition of the hardness components on the plate surface was observed at all even 5 hours after the start of the heat-treatment of 30 $m^3$ of the present crude soy sauce.

After the heat-treatment, the plate-type heat exchanger was dissembled to inspect the deposition state of the hardness components on the plate surface. It was found that white deposits were observed on all the plate surfaces in case of the comparative aliquot, whereas in case of the present aliquot no such deposits were observed at all.

According to the present invention, no hardness components deposit at all on the plate surfaces in the heat-treatment of crude soy sauce, prepared by using the present salt solution, in a plate-type heat exchanger, and thus the frequency of washing the plate surface can be considerably reduced.

What is claimed is:

1. A process for preparing soy sauce comprising the steps of:

mixing a soy sauce koji and a salt solution to form a mixture (maromi), fermenting and aging the mixture, compressing the aged mixture to obtain a crude soy sauce, and heat-treating the crude soy sauce at a temperature of 90°–130° C. for 30 minutes to 5 seconds using a plate-type heat exchanger, wherein the salt solution is obtained by admixing and reacting sodium carbonate or potassium carbonate with a crude salt solution comprising dissolved sea salt or dissolved rock salt to precipitate calcium and/or magnesium hardness components contained in the crude salt solution in the form of calcium carbonate and/or magnesium carbonate, and separating and removing the carbonate sediments and neutralizing a supernatant liquid.

* * * * *